Patented Dec. 13, 1949

2,491,452

UNITED STATES PATENT OFFICE 2,491,452

STABILIZED VITAMIN PREPARATION

Charles J. Kern, Long Island City, and Henry W. Del Vecchio, Brooklyn, N. Y., assignors to American Home Products Corporation, New York, N. Y., a corporation of Delaware No Drawing. Application August 20, 1948, Serial No. 45,424

3 Claims. (Cl. 167—81)

This invention relates to stabilizing agents for vitamins and vitamin containing products, particularly those containing thiamin hydrochloride, calcium pantothenate, ascorbic acid and sodium ascorbate.

One of the principal objects of the invention is to obtain relatively anhydrous stabilized vitamin preparations in which the tendency for diminishing the vitamin activity is less than in any compositions heretofore known.

Another object of the invention is to obtain stabilized vitamin products in a substantially anhydrous admixture which is protected from deterioration, when at climatic temperatures or temperatures considerably above normal climatic temperatures.

A further object of the invention is to obtain stabilizing agents for vitamin-containing preparations admixed with wax, oil or other oleaginous or waxy materials in capsules which possess no harmful physiological effects when incorporated in the vitamin composition in amounts sufficient to give effective stability.

Various other objects will become apparent from the following description of the invention.

It is well known that the stability of thiamin hydrochloride is greatest at pH levels of about 2.5 to 4.5. The stability of calcium pantothenate, on the other hand, is greatest at pH levels of about 6.0 to 7.0. On exposure to air, thiamine hydrochloride absorbs about 4 percent of moisture. The presence of this moisture acidifies the mixture, thereby accelerating the deterioration of the calcium pantothenate.

In a multi-vitamin composition, comprising thiamin hydrochloride, calcium pantothenate and ascorbic acid, the environment is essentially acid and there is a resulting loss of calcium pantothenate which requires a more alkaline environment for stability. In order to overcome this deterioration, sodium ascorbate is used either in place of or together with ascorbic acid. The calcium pantothenate is preserved by the presence of sodium ascorbate which maintains the pH level near the more alkaline range suitable for the stability of this vitamin. It becomes obvious, however, that having now obtained an environment suitable for calcium pantothenate, the same environment is unsuitable for preserving the stability of thiamin hydrochloride.

It has been found that the vitamin activity of thiamin hydrochloride and calcium pantothenate in admixture with sodium ascorbate and an oleaginous base can be effectively preserved by the use of glucono-delta-lactone which is admixed with the vitamins as a stabilizer agent. This compound is particularly effective not only because of its stabilizing efficiency as a buffering agent which is high but also because of its freedom from undesirable odor and color and its commercial availability.

The glucono-delta-lactone is believed to act as a buffering agent and stabilizer for the calcium pantothenate and thiamin hydrochloride by reacting with the moisture present in the thiamin hydrochloride to form gluconic acid. It is also believed that a buffering system is established between the gluconic acid formed and the sodium ascorbate when this substance is present in the mixture. The equilibrium mixture of sodium gluconate and gluconic acid stabilizes the pH level so that the thiamin hydrochloride and calcium pantothenate remain stable both at room temperature and at accelerated temperatures.

Glucono-delta-lactone is formed by the removal of the elements of water from the gluconic acid molecule. It is not an acid but in the presence of moisture it is partially hydrolyzed into gluconic acid. This hydration process proceeds fairly slowly at room temperature, but is accelerated by heat. The final product is an equilibrium mixture of gluconic acid and its gamma and delta lactones. On neutralization of the solution, a salt of gluconic acid is formed, the lactones being transformed to the acid as the equilibrium is upset by the combination of the gluconic acid with the neutralizing agent.

The following reactions illustrate the probable mechanism of the equilibrium reactions:

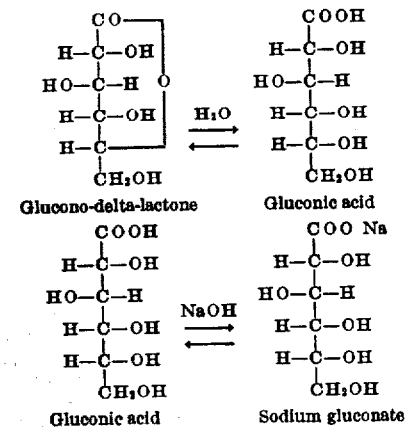

As a practical example of this invention, it has been found that thiamin hydrochloride and calcium pantothenate may be stabilized against vitamin deterioration by incorporating therein from about 2.0 to about 10.0% by weight of glucono-delta-lactone based on the total composition. Tests have been made on multivitamin mixtures containing the aforementioned stabilizer, at normal temperature. Tests have also been made on the vitamin stabilized product by subjecting it to accelerated tests by exposing same to a temperature of 40° C. In both the normal and accelerated tests, it has been found that a glucono-delta-lactone stabilized multivitamin product shows a remarkably low deterioration of thiamin hydrochloride and calcium pantothenate potencies and that this deterioration is far less than the unstabilized multivitamin product in the same environment.

In the preparation of soft gelatin capsules, the vitamin particles are usually suspended in an oil-wax mixture comprising a mixture of vegetable oil, hydrogenated oil and wax. The composition of this invention likewise contemplates the use of vegetable and/or animal or fish liver oils, hydrogenated oils and wax as the matrix for crystalline particles of active ingredients since the oleaginous portion contributes to the protection of instable elements by providing an oily or waxy anhydrous envelope around the crystalline particles. The composition of the invention is likewise effective in hard gelatin capsules, preferably mixed with a solid oleaginous or waxy ingredient such as hydrogenated oils, stearic acid or non-toxic waxes like paraffin or beeswax.

When vegetable oils are used, any of the commercially available oils such as corn oil, sesame oil, peanut oil, cottonseed oil, olive oil, soy bean oil, wheat germ oil, etc. may be used. Fish liver oils, which may also be present, particularly when vitamins A and D are desired may be from any marine source but those high in oil-soluble vitamins such as shark liver oil, cod liver oil, tuna liver oil, haddock liver oil, etc. are preferred. For hydrogenated oils, these may be selected from among the well-known lard substitute types, such as hydrogenated soy bean oil, cottonseed oil or in fact any hydrogenated vegetable oil, stearic acid, and substances of like nature. Among the non-toxic waxes contemplated may be mentioned white wax, paraffin, yellow beeswax, spermaceti, etc.

The following data illustrate the invention by comparing the stability of vitamin-containing preparations with and without glucono-delta-lactone.

It is obvious from the data as given above that glucono-delta-lactone effectively stabilizes vitamin-containing compositions against deteriorations.

Since most commercial multivitamin mixtures in capsules contain from 10 to 60% excesses of calcium pantothenate, and since the percent loss over a period of one year at room temperature may vary anywhere from about 20 to 65%, it becomes apparent that the use of a stabilizer as herein stated in the present invention maintains the label claim and avoids the use of large excesses to maintain label claims. In a similar manner, multivitamin mixtures in capsules contain from 10 to 50% excesses of thiamin hydrochloride and the present loss at room temperature for a period of one year may range from about 15 to 50%. Percent losses at accelerated temperatures for both thiamin hydrochloride and calcium pantothenate in commercial samples of capsules are considerably higher than those same capsules at room temperature. For example, the following table illustrates tests carried out on the same compositions as indicated in Tables I and II when the samples were held at 40° C. for one year.

*Table III*

| Composition No. | Amt. of B₁ in mg. | Assay after 1 year at 40° C. | | Per Cent Loss d-Calc. Panto. |
| --- | --- | --- | --- | --- |
| | | Amt. of d-Calcium Panto. in mg. | Per Cent Loss B₁ | |
| 1 | 5.70 | 4.56 | 12.31 | 8.80 |
| 2 | 6.24 | 4.13 | 10.09 | 4.84 |
| 3 | 6.39 | 4.17 | 10.00 | 10.90 |
| 4 | 5.96 | 4.36 | 14.12 | 14.34 |
| 5 | 3.75 | 0.75 | 37.50 | 85.00 |

It should be noted that Table I should not be taken as limitative of the invention. Various vitamin and growth accessory factors may be added. Suitable vitamin capsules may of course be prepared having either more or fewer ingre-

*Table I*

| Ingredient | 1 | 2 | 3 | 4 | 5 |
| --- | --- | --- | --- | --- | --- |
| | Percent | Percent | Percent | Percent | Percent |
| A Oil (400,000 A/Gm.) | 18.10 | 18.05 | 17.69 | 16.74 | 18.10 |
| D Oil (200,000 D/Gm.) | 1.22 | 1.18 | 1.00 | 0.99 | 1.22 |
| Vitamin B₁ | 2.54 | 2.53 | 2.49 | 2.30 | 2.54 |
| Vitamin B₂ | 3.64 | 3.63 | 3.57 | 3.30 | 3.64 |
| Vitamin B₆ | 0.34 | 0.33 | 0.33 | 0.30 | 0.34 |
| Vitamin C | 5.59 | 5.58 | 5.48 | 5.06 | 5.59 |
| Sodium Ascorbate | 25.42 | 25.37 | 24.92 | 23.02 | 25.42 |
| Niacin Amide | 10.17 | 10.15 | 9.97 | 9.20 | 10.17 |
| DL-Calcium Pantothenate | 4.87 | 4.06 | 3.99 | 3.68 | 4.87 |
| Mixed Tocopherols 34% | 17.81 | 17.52 | 17.34 | 16.48 | 17.81 |
| Glucono-delta-lactone | 1.69 | 3.38 | 4.98 | 8.93 | None |
| Hydrogenated Oil | 5.76 | 5.96 | 6.05 | 6.22 | 5.76 |
| Lecithin | 2.01 | 0.70 | 0.67 | 2.22 | 2.01 |
| Cottonseed Oil | 0.47 | 0.41 | 0.39 | 0.47 | 1.38 |
| Beeswax | 1.15 | 1.15 | 1.13 | 1.04 | 1.15 |
| Total | 99.96 | 100.00 | 100.00 | 99.95 | 100.00 |

*Table II*

| Composition No. | Amt. of B₁/Cap. in mg. | Amt. of d-Calc. Panto./Cap. in mg. | Assay after 1 year at Room Temp. | | | Percent Loss d-Calc. Pantothenate |
| --- | --- | --- | --- | --- | --- | --- |
| | | | Amt. of B₁ in mg. | Amt. of d-Calc. Panto. in mg. | Percent Loss B₁ | |
| 1 | 6.50 | 5.00 | 6.32 | 4.82 | 2.77 | 3.60 |
| 2 | 6.94 | 4.34 | 6.82 | 4.28 | 1.73 | 1.38 |
| 3 | 7.10 | 4.68 | 6.92 | 4.56 | 2.54 | 2.57 |
| 4 | 6.94 | 5.09 | 6.82 | 4.91 | 1.73 | 3.54 |
| 5 | 6.00 | 5.00 | 4.25 | 2.38 | 29.17 | 52.40 | dients than those indicated in Table I. Moreover, it should be clearly understood that the percentages as indicated in Table I may be varied widely depending on the product desired. It has been found that for practical purposes vitamin $B_1$ and d-calcium pantothenate should each be present to the extent of about 0.5 to about 5% by weight and ratios of $B_1$ to d-calcium pantothenate are best held at from 1:1 to 1:5. Also, sodium ascorbate should be present to the extent of about 4 to about 25% by weight while vegetable oil and/or fish liver oil should be present to the extent of about 35 to about 50% by weight and hydrogenated oil-wax base should be present to an extent of about 5 to about 40% by weight. A composition containing those ingredients in amounts falling within the ranges indicated can be effectively stabilized by the addition of about 2 to about 10% by weight of glucono-delta-lactone. All of these percentages are based on total composition.

It will be understood that other desirable substances may be added. It is intended to cover all modifications and changes permitted within the spirit and scope of the invention.

We claim:

1. A substantially anhydrous stabilized vitamin preparation comprising a product containing calcium pantothenate, thiamine hydrochloride and sodium ascorbate in an oleaginous vehicle, together with glucono-delta-lactone as a stabilizing agent.

2. A substantially anhydrous stabilized vitamin preparation comprising a product containing calcium pantothenate, thiamine hydrochloride and sodium ascorbate in a vegetable oil vehicle, together with glucono-delta-lactone as a stabilizing agent.

3. A substantially anhydrous stabilized vitamin preparation comprising a product containing calcium pantothenate, thiamine hydrochloride and sodium ascorbate in an oil and wax vehicle, together with glucono-delta-lactone as a stabilizing agent.

CHARLES J. KERN.
HENRY W. DEL VECCHIO.

REFERENCES CITED

The following references are of record in the file of this patent:

UNITED STATES PATENTS

| Number | Name | Date |
|---|---|---|
| 2,359,413 | Freedham | Oct. 3, 1944 |
| 2,433,688 | Fox | Dec. 30, 1947 |
| 2,499,041 | Upham | Sept. 7, 1948 |